United States Patent Office 2,874,158
Patented Feb. 17, 1959

2,874,158

HYDROGENATED CITRAZINIC ACID AND METHOD OF PREPARATION

André L. Langis, St. Laurent, Quebec, and Roger Gaudry, Mount Royal, Quebec, Canada, assignors to American Home Products Corporation, New York, N. Y., a corporation of Delaware No Drawing. Continuation of application Serial No. 476,848, December 21, 1954. This application August 16, 1957, Serial No. 678,546

3 Claims. (Cl. 260—281)

This application is a continuation of our copending application, Serial No. 476,848, filed December 21, 1954, now abandoned.

This invention relates to a new chemical compound prepared by hydrogenation of citrazinic acid, and to the process by which it is produced.

Citrazinic acid, which is 2,6-dihydroxy-4-carboxypyridine, is now commercially available. It has been discovered that this acid may be hydrogenated, preferably by treating the acid with hydrogen in the presence of a hydrogenation catalyst, and that a new chemical compound results. This compound is 2,6-dioxo-piperidine-4-carboxylic acid, $C_6H_7NO_4$, and it is believed to have the structural formula hereinafter set forth.

In the hydrogenation of citrazinic acid, utilizing hydrogen gas at a relatively low pressure, it has been observed that one mole is taken up during the course of the reaction. Best results have been obtained with hydrogen at gas pressures below 100 pounds per square inch, using one of the noble metal catalysts, such as metallic palladium, as the catalyst. Alternately, other common hydrogenation catalysts, and especially one or more of the noble metals, may be used.

In the ensuing detailed disclosure hydrogenation by the direct action of hydrogen under pressure in the presence of a noble metal hydrogenation catalyst, such as palladium, will be given as illustrative. Ordinarily it is preferred to utilize the palladium catalyst in the supported condition, i. e., supported on charcoal or on some other carrier.

Citrazinic acid is readily hydrogenated, one mole of hydrogen being absorbed per mole of the acid, to yield 2,6-dioxo-piperidine-4-carboxylic acid having the following structural formula:

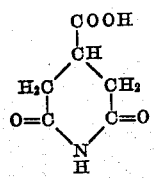

A typical sample of the new compound melts at 211–212° C. Infrared spectrum analysis confirms the above structure.

The new compound, 2,6-dioxo-piperidine-4-carboxylic acid, may be hydrolyzed under acid conditions, preferably by dilute hydrochloric acid, to yield propane tricarboxylic acid (tricarballylic acid). The propane tricarboxylic acid so produced was characterized by its melting point (161–162° C.) and by its infrared spectrum.

2,6-dioxo-piperidine-4-carboxylic acid, as prepared by hydrogenation of 2,6 - dihydroxy - 4 - carboxypyridine wherein one mole of hydrogen is absorbed per mole of the starting material, is useful in the synthesis of various organic chemicals. Since it is readily hydrolyzed to tricarballylic acid it may be utilized as the starting material for producing the latter. Tricarballylic acid is, of course, useful for the preparation of linear fiber-forming polymers, leatherlike polyester polyamides, and coating compositions that can be applied to glass.

Furthermore, 2,6-dioxo-piperidine-4-carboxylic acid is a useful intermediate in the preparation of the glutarimide moiety of the antibiotic actidione.

Example 10 grams (0.0645 mole) of citrazinic acid were suspended in 300 milliliters of 95 percent ethanol. There was then added, as hydrogenation catalyst, 300 milligrams of 10 percent palladium supported on charcoal as a carrier. The citrazinic acid was then hydrogenated by means of hydrogen gas at a pressure of 50 pounds per square inch. The temperature was 50° C. The introduction of hydrogen gas was continued for 16 hours until a total of 0.0645 mole of hydrogen (one mole per mole of citrazinic acid) had been absorbed. The catalyst and carrier were then filtered off, and the solvent evaporated to secure a white crystalline residue.

This white crystalline residue was then recrystallized from 95 percent ethanol. There was thus obtained 9 grams of a crystalline material melting at 211–212.5° C. Elemental analysis confirmed the empiric formula $C_6H_7NO_4$.

The chemical structure of the new compound thus obtained, 2,6-dioxo-piperidine-4-carboxylic acid, was also confirmed by hydrolyzing it to propane tricarboxylic acid. One gram (0.0064 mole) of the new compound was dissolved in 50 milliliters of dilute hydrochloric acid. This dilute hydrochloric acid was a 1:1 mixture of concentrated hydrochloric acid and water. The solution was refluxed for 17 hours, and then evaporated to dryness, a solid residue being thus obtained. The residue was then taken up in 50 milliliters of boiling acetone, the insoluble ammonium chloride present filtered off, and the clear solution again evaporated to dryness. This resulted in a solid residue. This residue was recrystallized from a 1:1 mixture of acetone and hexane. There was thus obtained 700 milligrams of propane tricarboxylic acid, melting at 161.5–162° C. Elemental analysis confirmed the empiric formula $C_6H_8O_6$.

We claim:

1. The process which comprises hydrogenating citrazinic acid with hydrogen gas at a pressure below about 100 pounds per square inch and in the presence of a hydrogenation catalyst until substantially one mole of hydrogen has been absorbed per mole of citrazinic acid.

2. The process which comprises treating citrazinic acid with hydrogen at a pressure of approximately 50 pounds per square inch and in the presence of a palladium hydrogenation catalyst until substantially one mole of hydrogen has been absorbed per mole of citrazinic acid.

3. The process which comprises treating citrazinic acid with hydrogen gas at a pressure below about 100 pounds per square inch and in the presence of a noble metal hydrogenation catalyst until substantially one mole of hydrogen has been absorbed per mole of citrazinic acid.

References Cited in the file of this patent

Hope et al.: J. Chem. Soc., vol. 121, pages 2223–35 (1922).